US008018099B2

(12) United States Patent
Chen

(10) Patent No.: US 8,018,099 B2

(45) **Date of Patent: *Sep. 13, 2011**

(54) TOUCH-SENSITIVE PAPER SHREDDER CONTROL SYSTEM

(75) Inventor: Liangneng Chen, Shanghai (CN)

(73) Assignee: Aurora Office Equipment Co., Ltd., Shanghai (CN)

( * ) Notice: Subject to any disclaimer, the term of this patent is extended or adjusted under 35 U.S.C. 154(b) by 0 days.

This patent is subject to a terminal disclaimer.

(21) Appl. No.: 12/576,493

(22) Filed: Oct. 9, 2009

(65) Prior Publication Data

US 2010/0116916 A1 May 13, 2010

Related U.S. Application Data

(63) Continuation of application No. 11/827,798, filed on Jul. 12, 2007, now Pat. No. 7,622,831, which is a continuation-in-part of application No. 11/468,651, filed on Aug. 30, 2006, now Pat. No. 7,471,017.

(30) Foreign Application Priority Data

Aug. 19, 2006 (CN) .................... 2006 2 00439955 U

(51) Int. Cl.
*H02H 11/00* (2006.01)

(52) U.S. Cl. ...................................................... 307/326

(58) Field of Classification Search .................. 307/112, 307/326; 241/34, 37.5; 192/130; 83/362
See application file for complete search history.

(56) References Cited

U.S. PATENT DOCUMENTS

| | | | |
|---|---|---|---|
| 3,111,800 | A | 11/1963 | Quianthy |
| 3,629,530 | A | 12/1971 | Fischer |
| 3,724,766 | A | 4/1973 | Bosland |
| 3,728,501 | A | 4/1973 | Larson et al. |
| 3,746,815 | A | 7/1973 | Drummer |
| 3,769,473 | A | 10/1973 | Lay |
| 3,780,246 | A | 12/1973 | Beckering et al. |

(Continued)

FOREIGN PATENT DOCUMENTS

| | | |
|---|---|---|
| CN | 2372057 | 4/2000 |

(Continued)

OTHER PUBLICATIONS

Andrew J. Scarlett et al., Guard Interlocking for self-propelled harvesting machinery, Silsoe Research Institute, HSE Book 2002.

(Continued)

*Primary Examiner* — Jared J Fureman
*Assistant Examiner* — Carlos Amaya
(74) *Attorney, Agent, or Firm* — Wang, Hartman, Gibbs & Cauley; John O'Rourke

(57) ABSTRACT

The invention is directed to a touch-sensitive paper shredder control system. The touching feature is implemented through a series of electronic circuits, taking input from a conductive touch panel on the shredder feed throat, processing the signal, and through a motor driving circuit, stopping the mechanical parts of the shredder. The system has a touch detection circuit unit, which contains a bioelectricity controlled switching circuit to sense the conductive touch panel. The bioelectricity controlled switching circuit is configured to trigger a ground switching circuit in the touch detection circuit unit which outputs to a multifunction control circuit unit. The control circuit unit then takes care of the remaining protection issues. The touching device for paper shredders protects humans and other living beings including pets from injuries through automatic and real time monitoring. The complete control process is both safe and sensitive.

19 Claims, 5 Drawing Sheets

U.S. PATENT DOCUMENTS 3,785,230 A 1/1974 Lokey
3,829,850 A 8/1974 Guetersloh
3,860,180 A 1/1975 Goldhammer
3,873,796 A 3/1975 Worobec, Jr.
3,919,596 A 11/1975 Bellis
3,947,734 A 3/1976 Fyler
3,952,239 A 4/1976 Owings et al.
3,953,696 A 4/1976 Reimann et al.
3,971,906 A 7/1976 Sahrbacker
4,002,874 A 1/1977 Brown
4,016,490 A 4/1977 Weckenmann et al.
4,018,392 A 4/1977 Wagner
4,062,282 A 12/1977 Miller et al.
4,068,805 A 1/1978 Oswald
4,082,232 A 4/1978 Brewer
4,107,484 A 8/1978 Petersen, III
4,117,752 A 10/1978 Yoneda
4,125,228 A 11/1978 Brewer
4,135,068 A 1/1979 Burns
4,162,042 A 7/1979 Mommsen et al.
4,172,400 A 10/1979 Brierley
4,180,716 A 12/1979 Suzuki
4,187,420 A 2/1980 Piber
4,194,698 A 3/1980 Kosmowski
4,262,179 A 4/1981 Bauer
4,276,459 A 6/1981 Willett et al.
4,277,666 A 7/1981 Vignaud
4,349,814 A 9/1982 Akehurst
4,380,721 A 4/1983 Bullock et al.
4,411,391 A 10/1983 Crane
4,423,844 A 1/1984 Sours et al.
4,449,062 A 5/1984 Wilson
4,471,915 A 9/1984 Levin et al.
4,510,860 A 4/1985 LaBarge et al.
4,518,958 A 5/1985 Cook et al.
4,549,097 A 10/1985 Ulmer
4,562,971 A 1/1986 Schwelling
4,564,146 A 1/1986 Bleasdale
4,598,182 A 7/1986 Breslin
4,664,317 A 5/1987 Morton
4,673,136 A 6/1987 Bianco et al.
4,683,381 A 7/1987 Dufoug
4,693,428 A 9/1987 Raterman et al.
4,706,895 A 11/1987 Bricker
4,709,197 A 11/1987 Goldhammer et al.
4,713,509 A 12/1987 Chebowski
4,751,603 A 6/1988 Kwan
4,753,323 A 6/1988 Kahkipuro
4,767,895 A 8/1988 Parrish
4,771,359 A 9/1988 Link
4,784,601 A 11/1988 Nitta
4,784,602 A 11/1988 Nitta
4,798,116 A 1/1989 Silver et al.
4,817,877 A 4/1989 Itoh et al.
4,821,967 A 4/1989 Moriyama
4,824,029 A 4/1989 Stottmann et al.
4,839,533 A 6/1989 Aga
4,842,205 A 6/1989 Araki et al.
4,859,172 A 8/1989 Nitta
4,882,458 A 11/1989 Berg et al.
4,893,027 A 1/1990 Kammerer et al.
4,900,881 A 2/1990 Fischer
4,910,365 A 3/1990 Kuo
4,944,462 A 7/1990 Raterman et al.
4,982,058 A 1/1991 Schroeder et al.
5,037,033 A 8/1991 Stottmann et al.
5,044,270 A 9/1991 Schwelling
5,045,648 A 9/1991 Fogleman, Sr.
5,065,947 A 11/1991 Farnsworth
5,081,406 A 1/1992 Hughes et al.
5,100,067 A 3/1992 Konig et al.
5,135,178 A 8/1992 Strohmeyer
5,166,679 A 11/1992 Vranish et al.
5,167,374 A 12/1992 Strohmeyer
5,171,143 A 12/1992 Sohn
5,186,398 A 2/1993 Vigneaux, Jr.
5,207,392 A 5/1993 Stangenberg et al.
5,236,138 A 8/1993 Stangenberg et al.
5,268,553 A 12/1993 Shimoji
5,269,473 A 12/1993 Strohmeyer et al.
5,275,342 A 1/1994 Galanty
5,279,467 A 1/1994 Lydy
5,295,633 A 3/1994 Kimbro et al.
5,318,229 A 6/1994 Brown
D348,431 S 7/1994 Hoffman et al.
5,345,138 A 9/1994 Mukaidono et al.
5,356,286 A 10/1994 Sher
5,397,890 A 3/1995 Schueler et al.
5,407,346 A 4/1995 Sher
5,421,720 A 6/1995 Sher
5,432,308 A 7/1995 Howie, Jr.
5,436,613 A 7/1995 Ghosh et al.
5,460,516 A 10/1995 Sher
5,494,229 A 2/1996 Rokos et al.
5,568,895 A 10/1996 Webb et al.
5,607,295 A 3/1997 Khemarangsan
5,621,290 A 4/1997 Heller et al.
5,636,801 A 6/1997 Kroger
5,655,725 A 8/1997 Kroger
5,662,280 A 9/1997 Nishio et al.
5,667,152 A 9/1997 Mooring
5,680,999 A 10/1997 Wada
5,704,776 A 1/1998 Sher
5,724,737 A 3/1998 Stones
5,775,605 A 7/1998 Tsai
5,788,476 A 8/1998 Sher
5,829,697 A 11/1998 Kroger
5,829,963 A 11/1998 Ichikawa
5,850,342 A 12/1998 Nakamura et al.
5,868,242 A 2/1999 Hall et al.
5,884,855 A 3/1999 Chang
5,897,065 A 4/1999 Schwelling
5,921,367 A 7/1999 Kashioka et al.
D412,716 S 8/1999 Kroger
5,942,975 A 8/1999 Sorensen
5,988,542 A 11/1999 Henreckson
6,065,696 A 5/2000 Tsai
6,079,645 A 6/2000 Henreckson et al.
6,082,643 A 7/2000 Kovacs
6,082,644 A 7/2000 Turner
6,089,482 A 7/2000 Chang
6,113,017 A 9/2000 Tsai
6,116,528 A 9/2000 Schwelling
6,247,828 B1 6/2001 Herst
D444,809 S 7/2001 Chang
6,260,780 B1 7/2001 Kroger et al.
6,265,682 B1 7/2001 Lee
6,274,828 B1 8/2001 Chu
6,308,904 B1 10/2001 Chang
6,325,309 B1 12/2001 Chang
6,340,124 B1 1/2002 Charles et al.
6,376,939 B1 4/2002 Suzuki et al.
6,418,004 B1 7/2002 Mather
6,501,198 B2 12/2002 Taylor et al.
6,536,536 B1 3/2003 Gass et al.
6,550,701 B1 4/2003 Chang
6,575,285 B2 6/2003 Jong
D481,416 S 10/2003 Chang
6,629,654 B2 10/2003 Neely et al.
6,655,943 B1 12/2003 Peterson et al.
6,676,050 B2 1/2004 Chang
6,676,460 B1 1/2004 Motsenbocker
6,682,006 B2 1/2004 Lee
6,724,324 B1 4/2004 Lambert
D494,607 S 8/2004 Hunag
6,775,018 B1 8/2004 Taniguchi
6,779,747 B2 8/2004 Mclean et al.
6,813,983 B2 11/2004 Gass et al.
6,822,698 B2 11/2004 Clapper
6,826,988 B2 12/2004 Gass et al.
6,834,730 B2 12/2004 Gass et al.
6,857,345 B2 2/2005 Gass et al.
D502,713 S 3/2005 Hunag
D502,714 S 3/2005 Hunag
6,877,410 B2 4/2005 Gass et al.
6,880,440 B2 4/2005 Gass et al.
6,920,814 B2 7/2005 Gass et al.

| | | | |
|---|---|---|---|
| 6,922,153 | B2 | 7/2005 | Pierga et al. |
| 6,945,148 | B2 | 9/2005 | Gass et al. |
| 6,945,149 | B2 | 9/2005 | Gass et al. |
| 6,957,601 | B2 | 10/2005 | Gass et al. |
| 6,962,301 | B1 | 11/2005 | Chang et al. |
| 6,964,386 | B2 | 11/2005 | Ho |
| 6,966,513 | B2 | 11/2005 | Chang |
| 6,976,648 | B2 | 12/2005 | Chang |
| 6,978,954 | B2 | 12/2005 | Kroger et al. |
| 6,979,813 | B2 | 12/2005 | Avril |
| 6,981,667 | B2 | 1/2006 | Hunag |
| 6,983,903 | B2 | 1/2006 | Chang |
| 6,994,004 | B2 | 2/2006 | Gass et al. |
| 6,997,090 | B2 | 2/2006 | Gass et al. |
| 7,000,514 | B2 | 2/2006 | Gass et al. |
| 7,024,975 | B2 | 4/2006 | Gass et al. |
| 7,040,559 | B2 | 5/2006 | Matlin et al. |
| 7,044,410 | B2 | 5/2006 | Hunag |
| 7,048,218 | B2 | 5/2006 | Hunag |
| 7,055,417 | B1 | 6/2006 | Gass |
| 7,077,039 | B2 | 7/2006 | Gass et al. |
| 7,083,129 | B2 | 8/2006 | Beam, III |
| 7,083,131 | B2 | 8/2006 | Ting |
| 7,093,668 | B2 | 8/2006 | Gass et al. |
| 7,098,800 | B2 | 8/2006 | Gass |
| 7,100,483 | B2 | 9/2006 | Gass et al. |
| 7,121,358 | B2 | 10/2006 | Gass et al. |
| 7,137,326 | B2 | 11/2006 | Gass et al. |
| 7,150,422 | B2 | 12/2006 | Wang |
| 7,171,879 | B2 | 2/2007 | Gass et al. |
| 7,171,897 | B2 | 2/2007 | Barajas et al. |
| 7,195,185 | B2 | 3/2007 | Matlin |
| 7,197,969 | B2 | 4/2007 | Gass et al. |
| 7,210,383 | B2 | 5/2007 | Gass et al |
| 7,225,712 | B2 | 6/2007 | Gass et al. |
| 7,228,772 | B2 | 6/2007 | Gass |
| 7,231,856 | B2 | 6/2007 | Gass et al. |
| 7,284,467 | B2 | 10/2007 | Gass et al. |
| 7,290,472 | B2 | 11/2007 | Gass et al. |
| 7,303,158 | B1 | 12/2007 | Abramson et al. |
| 7,308,843 | B2 | 12/2007 | Gass et al. |
| 7,311,276 | B2 | 12/2007 | Matlin et al. |
| 7,328,752 | B2 | 2/2008 | Gass et al. |
| 7,344,096 | B2 | 3/2008 | Matlin et al. |
| D583,859 | S | 12/2008 | Holderfield et al. |
| D584,342 | S | 1/2009 | Parratt et al. |
| D591,335 | S | 4/2009 | Holderfield et al. |
| 7,631,822 | B2 | 12/2009 | Matlin et al. |
| 7,631,823 | B2 | 12/2009 | Matlin et al. |
| 7,631,824 | B2 | 12/2009 | Matlin et al. |
| 7,635,102 | B2 | 12/2009 | Matlin et al. |
| 2001/0030114 | A1 | 10/2001 | Thielman |
| 2002/0002942 | A1 | 1/2002 | Abraham et al. |
| 2002/0017175 | A1 | 2/2002 | Gass et al. |
| 2002/0017176 | A1 | 2/2002 | Gass et al. |
| 2002/0017178 | A1 | 2/2002 | Gass et al. |
| 2002/0017179 | A1 | 2/2002 | Gass et al. |
| 2002/0017180 | A1 | 2/2002 | Gass et al. |
| 2002/0017181 | A1 | 2/2002 | Gass et al. |
| 2002/0017182 | A1 | 2/2002 | Gass et al. |
| 2002/0017183 | A1 | 2/2002 | Gass et al. |
| 2002/0017184 | A1 | 2/2002 | Gass et al. |
| 2002/0017336 | A1 | 2/2002 | Gass et al. |
| 2002/0020261 | A1 | 2/2002 | Gass et al. |
| 2002/0020262 | A1 | 2/2002 | Gass et al. |
| 2002/0020263 | A1 | 2/2002 | Gass et al. |
| 2002/0020265 | A1 | 2/2002 | Gass et al. |
| 2002/0056348 | A1 | 5/2002 | Gass et al. |
| 2002/0056349 | A1 | 5/2002 | Gass et al. |
| 2002/0056350 | A1 | 5/2002 | Gass et al. |
| 2002/0059853 | A1 | 5/2002 | Gass et al. |
| 2002/0059854 | A1 | 5/2002 | Gass et al. |
| 2002/0059855 | A1 | 5/2002 | Gass et al. |
| 2002/0066346 | A1 | 6/2002 | Gass et al. |
| 2002/0069734 | A1 | 6/2002 | Gass et al. |
| 2002/0111702 | A1 | 8/2002 | Angel |
| 2002/0139877 | A1 | 10/2002 | Beam |
| 2002/0170399 | A1 | 11/2002 | Gass et al. |
| 2002/0170400 | A1 | 11/2002 | Gass et al. |
| 2002/0190581 | A1 | 12/2002 | Gass et al. |
| 2003/0002942 | A1 | 1/2003 | Gass et al. |
| 2003/0005588 | A1 | 1/2003 | Gass et al. |
| 2003/0015253 | A1 | 1/2003 | Gass et al. |
| 2003/0019341 | A1 | 1/2003 | Gass et al. |
| 2003/0037651 | A1 | 2/2003 | Gass et al. |
| 2003/0056853 | A1 | 3/2003 | Gass et al. |
| 2003/0058121 | A1 | 3/2003 | Gass et al. |
| 2003/0090224 | A1 | 5/2003 | Gass et al. |
| 2003/0090226 | A1 | 5/2003 | Chen et al. |
| 2003/0196824 | A1 | 10/2003 | Gass et al. |
| 2004/0008122 | A1 | 1/2004 | Michael |
| 2004/0040426 | A1 | 3/2004 | Gass et al. |
| 2004/0043696 | A1 | 3/2004 | Suzuki |
| 2004/0163514 | A1 | 8/2004 | Gass et al. |
| 2004/0173430 | A1 | 9/2004 | Gass |
| 2004/0181951 | A1 | 9/2004 | Wittke |
| 2004/0194594 | A1 | 10/2004 | Dils et al. |
| 2004/0226800 | A1 | 11/2004 | Pierga et al. |
| 2005/0039586 | A1 | 2/2005 | Gass et al. |
| 2005/0039822 | A1 | 2/2005 | Gass et al. |
| 2005/0041359 | A1 | 2/2005 | Gass |
| 2005/0132859 | A1 | 6/2005 | Hunag |
| 2005/0157203 | A1 | 7/2005 | Nakakuki et al. |
| 2005/0166736 | A1 | 8/2005 | Gass et al. |
| 2005/0218250 | A1 | 10/2005 | Matlin et al. |
| 2005/0274834 | A1 | 12/2005 | Huang |
| 2005/0274836 | A1 | 12/2005 | Chang |
| 2006/0054724 | A1 | 3/2006 | Matlin et al. |
| 2006/0054725 | A1 | 3/2006 | Matlin |
| 2006/0091247 | A1 | 5/2006 | Matlin |
| 2006/0157600 | A1 | 7/2006 | Wang |
| 2006/0169619 | A1 | 8/2006 | Wang |
| 2006/0219827 | A1 | 10/2006 | Matlin et al. |
| 2006/0249609 | A1 | 11/2006 | Huang |
| 2007/0012808 | A1 | 1/2007 | Kao |
| 2007/0034725 | A1 | 2/2007 | Duh |
| 2007/0246581 | A1 | 10/2007 | Matlin et al. |
| 2008/0105772 | A2 | 5/2008 | Matlin |

FOREIGN PATENT DOCUMENTS

| | | |
|---|---|---|
| CN | 2383583 | 6/2000 |
| DE | 733413 | 3/1943 |
| DE | 7818838 | 11/1979 |
| DE | 3247299 | 7/1984 |
| DE | 3313232 | 10/1984 |
| DE | 3208676 | 4/1986 |
| DE | 3540896 | 5/1987 |
| DE | 8619856 | 9/1988 |
| DE | 8619856 | 10/1988 |
| DE | 3819285 | 12/1989 |
| DE | 4014669 | 11/1991 |
| DE | 4121330 | 1/1993 |
| DE | 19519858 | 5/1996 |
| DE | 19703575 | 8/1998 |
| DE | 19960267 | 7/2000 |
| EP | 0191137 | 8/1986 |
| EP | 0511535 | 4/1992 |
| EP | 00522071 | 5/1993 |
| EP | 0562076 | 9/1993 |
| EP | 0736886 | 10/1996 |
| EP | 855221 | 7/1998 |
| EP | 0855221 | 7/1998 |
| EP | 1069954 | 1/2001 |
| EP | 1195202 | 4/2002 |
| EP | 1442834 | 4/2004 |
| GB | 2096919 | 10/1982 |
| GB | 2199962 | 7/1988 |
| GB | 2203063 | 10/1988 |
| GB | 2234690 | 2/1991 |
| JP | 52011691 | 1/1977 |
| JP | 57-76734 | 1/1982 |
| JP | 57076734 | 5/1982 |
| JP | 62146877 | 6/1987 |
| JP | 3143552 | 6/1991 |
| JP | 4110143 | 4/1992 |
| JP | 03143552 | 5/1992 |
| JP | 04110143 | 5/1992 |
| JP | 04157093 | 5/1992 |

| | | | |
|---|---|---|---|
| JP | 04180852 | | 6/1992 |
| JP | 05014164 | | 1/1993 |
| JP | 05068906 | | 3/1993 |
| JP | 05092144 | | 4/1993 |
| JP | 05123593 | | 5/1993 |
| JP | 05211691 | | 8/1993 |
| JP | 05280243 | | 10/1993 |
| JP | 06137104 | | 5/1994 |
| JP | 06277548 | | 10/1994 |
| JP | 07039778 | | 5/1995 |
| JP | 07136539 | | 5/1995 |
| JP | 07155629 | A2 | 6/1995 |
| JP | 07157012 | A2 | 6/1995 |
| JP | 07299377 | A2 | 11/1995 |
| JP | 07328469 | A2 | 12/1995 |
| JP | 8001026 | | 1/1996 |
| JP | 09070551 | A2 | 3/1997 |
| JP | 09075763 | A2 | 3/1997 |
| JP | 09139161 | A2 | 5/1997 |
| JP | 09262491 | A2 | 10/1997 |
| JP | 10-048344 | | 2/1998 |
| JP | 10034003 | A2 | 2/1998 |
| JP | 10-089592 | | 4/1998 |
| JP | 11216383 | A2 | 8/1999 |
| JP | 20076014 | | 3/2000 |
| JP | 20346288 | | 12/2000 |
| JP | 2001150383 | A2 | 6/2001 |
| JP | 2001-349139 | | 12/2001 |
| JP | 21349139 | | 12/2001 |
| JP | 24321993 | | 11/2004 |
| JP | 200432199 | A2 | 11/2004 |
| JP | 26075831 | | 3/2006 |
| JP | 2007-075822 | | 3/2007 |
| JP | 27075822 | | 3/2007 |
| WO | WO8403650 | | 9/1984 |
| WO | WO9101860 | | 2/1991 |
| WO | WO92/00159 | | 1/1992 |
| WO | WO9306570 | | 4/1993 |
| WO | WO9308356 | | 4/1993 |
| WO | WO94/13441 | | 6/1994 |
| WO | WO9413441 | | 6/1994 |
| WO | WO9613362 | | 9/1996 |
| WO | WO9637350 | | 11/1996 |
| WO | WO9852728 | | 11/1998 |
| WO | WO0048283 | | 8/2000 |
| WO | WO02060588 | | 8/2002 |
| WO | WO02/082613 | | 10/2002 |
| WO | WO03/006213 | | 1/2003 |
| WO | WO2005/084861 | | 9/2005 |
| WO | WO2005097331 | | 10/2005 |
| WO | WO2005107951 | | 11/2005 |
| WO | WO2006049784 | | 1/2006 |
| WO | PCT/US2005/028290 | | 3/2006 |
| WO | WO2006/031324 | | 3/2006 |
| WO | WO2006031324 | | 3/2006 |
| WO | WO2006074122 | | 7/2006 |
| WO | WO2007/060698 | | 5/2007 |
| WO | WO2007/109753 | | 9/2007 |
| WO | WO2008/011517 | | 1/2008 |
| WO | WO2008/014276 | | 1/2008 |
| WO | WO2008/014276 | | 4/2008 |
| WO | WO2008/042538 | | 4/2008 |
| WO | WO2008/064392 | | 6/2008 |

OTHER PUBLICATIONS

Industrial Guarding Program Energy Sources Machinery Equipment and Materials, OFSWA Sep. 2002 Version 1.0.

Navigating the maze of proximit sensor selection, Allen-Bradley, Sensors Today, vol. 2, Issue 1 1999.

The Limitations of Radiofrequency Presence sensing Device, US Dept. of Labor, OSHA, Sep. 21, 1987.

Charge-Transfer Touch Sensor, Quantum Research Group Ltd, 2001.

Safety Mats, Presence Sensing Safety Devices, Allen-Bradley, 2-72.

Tom Begnal, Sawstop and bandsaws might soon be an option, Taunton 2008.

Safeguarding woodworking machines and worker safety, tablesaw blade safety device, WOODWEB forum, 2008.

Nils Karlsson, Theory and application of a capacitive sensor for safeguarding in industry, Dept. of Physics and Measurement Techology, Mar. 1994.

J.L. Novak & J.T. Feddema, a capacitance-based proximity sensor for whole arm obstacle avoidance, Sandia National Laboratories Albuquerque NM 87185, Dec. 1992.

D.S. Chauhan & P.H. Dehoff, a magneto-sensitive skin for robots in space, Dept. of Mechanical Engineering & Engineering Science University of North carolina at charlotte. Jul. 1991.

Thomas G. Zimmerman et al., aplying electric field sensing to human-computer interfaces, MIT Media Laboratory Physics and Media Group, May 1995.

Proximity Sensors (book), Festo Didactic, Germany 2003.

Lennart Bavall & Nils Karlsson, capacitive detection of humans for safety in industry—a numerical and experimental investigation, Linkoping Institute of Tech., Sweden Oct. 1997.

concepts and techniques of machine safeguarding, US Dept. of Labor, OSHA 3067, 1992.

Designing a safe highly productive system, thefabricator.com, May 30, 2002.

Joshua Smith et al., Electric Field Sensing for graphical interfaces, May/Jun. 1998.

TI's Digital signal Controllers put brake on sawstop table saw, www.embeddedstar.com, 2005.

Doubled productivity reduced product damage, Gorbel Inc., 2003.

TOUCH-SENSITIVE PAPER SHREDDER CONTROL SYSTEM

CROSS-REFERENCE TO RELATED PATENTS AND APPLICATIONS

This U.S. Patent Application claims priority to, and is a Continuation of, U.S. application Ser. No. 11/827,798, entitled "Touch-Sensitive Paper Shredder Control System," filed Jul. 12, 2007, which is a continuation-in-part of U.S. Pat. No. 7,471,017, which Patent being filed on Aug. 30, 2006 and issued on Dec. 30, 2008, with both Application and Patent being of the same inventor hereof, and both being assigned to the same Assignee hereof, and with both Application and Patent being respectively incorporated by reference in their entirety.

FIELD OF THE INVENTION

This invention is related to office equipment and the safe control of paper shredders, in particular touch-sensitive paper shredder control systems.

BACKGROUND OF THE INVENTION

Automated office appliances have proliferated in modern life and workspaces, and one of the most common appliances are paper shredders. Currently, paper shredders have entered into homes, some of them with automatic sensors. The sensors may be configured to detect objects inserted therein and signal the paper shredder to begin to work by grabbing the object and shredding them. Unless the paper shredder is turned off, the shredder may always be in stand-by mode. However, because paper shredders are destructive devices, if human users are not careful when using them, an injury may occur. Many current paper shredders do not have protective devices to prevent objects or body parts from entering into the throat of the shredder—potentially bringing a safety hazard into the office or home.

Among the present day paper shredders, there have been shredders using the technology of contact detection to stop the shredder's blades from injuring a person or pet. Referring to FIG. 1, the circuit shown therein is an example of this technology. SW2 is a polarity conversion switch and it can exchange the hot lead and ground lead of the AC power. Resistors R12 and R13, capacitors C3 and C2, and diodes D11, D12, D13, D14, D15 and D6 comprise a 24V power supply for the relay. Diode D6, D7, and capacitor C1 comprise a power supply for U1, the voltage detection integrated circuit. The positive terminal of the power supply is the hot line of the AC power. Relay switch RLY-1, diode D2, transistor Q1, resistors R5, R27, and R6, and optical coupler U5 comprise a power supply for the equipment. Diodes D1, D8 and D21, thermal control lamp (orange), transistor Q4, resistors R4, R14, and R11, and motor thermal control switch comprise a thermal control indication circuit. Fuse F1, switch RLY1, motor, function switch, and motor thermal control switch comprise a motor operation circuit. The rotation direction is determined by the function switch setting. Power supply, resistors R7, R1, R9, R2, R8 and R10, diodes D20, D16, D4, D5, D9 and D10, transistors Q2 and Q3, and pin 5 of the voltage detection integrated circuit comprise a LED indication circuit. The metal part of the panel, resistors R20, R19, R21 and R22, capacitor C8, and diodes D19 and D17 comprise a touch detection circuit.

When the function switch is set at the "off" position, the machine is not working. When the function switch is set at other positions and the wastepaper basket is separated from the machine, the machine is on but not capable of cutting paper. When the basket is detached from the machine body, the spring switch is open to cut power to the motor. The operation of the circuit for the breaking of the spring is as follows: pin 1 of U1 detects the break of the spring, pin 5 of U1 becomes "high", Q3 and Q2 cutoff and the motor doesn't turn. The power indicator and touch/basket detach indicator are on because these two indicators, R7, R8, D9, and the motor thermal control switch form a current loop.

When the function switch is moved away from "off", and the wastepaper basket is in position, the machine is ready to work. The sequence of circuit operation is as follows: pin 1 of U1 becomes "low" and Q3 and Q2 become conducting. At the same time, pin 6 of U1 becomes "low", Q1 is on, and the relay RLY 1 is closed. Now if the function switch is set at "on", the machine will cut the paper if there is paper in the throat, otherwise the shredder is on standby. Under these circumstances, if hands, metal, or living animals contact the metal part at the feed throat, AC power, circuit elements (R21, R19, R20), and the contact will form a circuit, and turn off the motor because pin 8 of U1 now is "low" and pin 5 and 6 of U1 are "high". To be more specific, as pin 6 of U1 is "high", Q1 is off and the motor power is turned off. As pin 5 of U1 is "high" and Q2 and Q3 are cut off, the touch protection indicator is on. After the contact is removed from the feed throat, the shredder returns to normal operation.

The touch protection is achieved through the installment of conductive touch panel at the paper intake. When touching the conductive panel, the conductivity of human body provides a faint signal to the control circuit to activate the touch protection. In this case, two 2.2M ohm resistors largely decrease the current that flows through the human body and thus the circuit may not harm a human. By using this technique, a sensitive voltage detection integrated circuit is needed to monitor the status of the touch panel in real time. Thus the demand for a highly stable and sensitive integrated circuit is apparent. Circuit aging caused by long-term usage will also diminish or even cut the circuit's detection capability. As for the two resistors with high values, they limit the current that may flow through the human body, but they may also lose their capability in a humid environment. Moreover, a human may come in direct contact with AC power, causing electric shock or even endangering life.

SUMMARY OF THE INVENTION

The present invention solves the above-mentioned shortcomings by providing a touch-sensitive paper shredder control system making use of bioelectricity. The control process is safe and sensitive. The circuit is stable in performance, and can be applied in a wide degree of situations. To meet the above objectives, the touching device for paper shredders is constructed as below.

The touch-sensitive paper shredder control system may include a function module, power supply module, conductive touch panel, and a shredder mechanical component. The function module may include a touch detection circuit unit, motor reversal detection circuit unit, paper intake detection circuit unit, overload protection circuit unit, control circuit unit, and function switch having on, off, and reverse positions. All units in the function module may be connected directly to the control circuit unit except for the function switch, which, together with the control circuit unit, controls the motor driving circuit unit, and thus the shredder's mechanical components.

The power supply module may include an AC power interface switch, safety switch, fuse, control switch, power supply of control circuit unit, and motor driving circuit unit. The AC power interface switch, safety switch, fuse, and control switch may be connected in series and, through the control of the function switch, connect to the motor driving circuit unit. The control switch is a relay switch. The AC power, which flows through the fuse, is rectified, filtered and regulated to provide DC power to all circuit units.

The conductive touch panel may be connected to the touch detection circuit unit. The touch detection circuit unit consists of a bioelectricity controlled switching circuit and a ground switch circuit. The bioelectricity controlled switching circuit may be a transistor circuit with a first transistor where the touch panel is connected to the base of the first transistor via a first resistor. The base of the first transistor is also connected to ground via a parallel combination of a second resistor and a first capacitor. The emitter of the first transistor is connected to ground via a parallel combination of a third resistor and a second capacitor, and is also connected to the input of the ground switch circuit.

The collector of the first transistor drives in parallel, a power indicator LED and a touch indicator LED and is then connected to the power supply. The ground switching circuit is also a transistorized switching circuit having a second transistor. The base of the second transistor is connected to the output of the bioelectricity controlled switching circuit, the emitter is grounded, and the collector is connected to the input of the control circuit unit via an optical coupler and to the power supply via a fourth resistor.

The paper intake detection circuit unit is connected to the control circuit unit also. The paper intake detection circuit unit comprises a light emitting diode and a photosensitive diode. The emitting area of the former and the optics sensing part of the latter face each other and are installed on the walls of opposite sides of the feed throat. The overload protection circuit and the motor reversal detection circuit unit are connected to the control circuit unit.

The touch-sensitive paper shredder control system has adopted cascaded circuits to ensure human safety when a human touches the conductive touch panel. The electricity from the human body enables the bioelectricity controlled switching circuit, and then all the connected circuits. The control circuit unit disables the mechanical part of the shredder and it ensures human safety. Even if the power switch is turned on, the mechanical part of the shredder still doesn't work. The shredder realizes real time monitoring. The complete control process is both safe and sensitive. The machine performance is stable and reliable and easy to operate without human oversight.

BRIEF DESCRIPTION OF THE DRAWINGS

The invention is generally shown by way of reference to the accompanying drawings in which.

DETAILED DESCRIPTION OF THE INVENTION

Some embodiments are described in detail with reference to the related drawings. Additional embodiments, features and/or advantages will become apparent from the ensuing description or may be learned by practicing the invention. In the figures, which are not drawn to scale, like numerals refer to like features throughout the description. The following description is not to be taken in a limiting sense, but is made merely for the purpose of describing the general principles of the invention.

Figure 1:
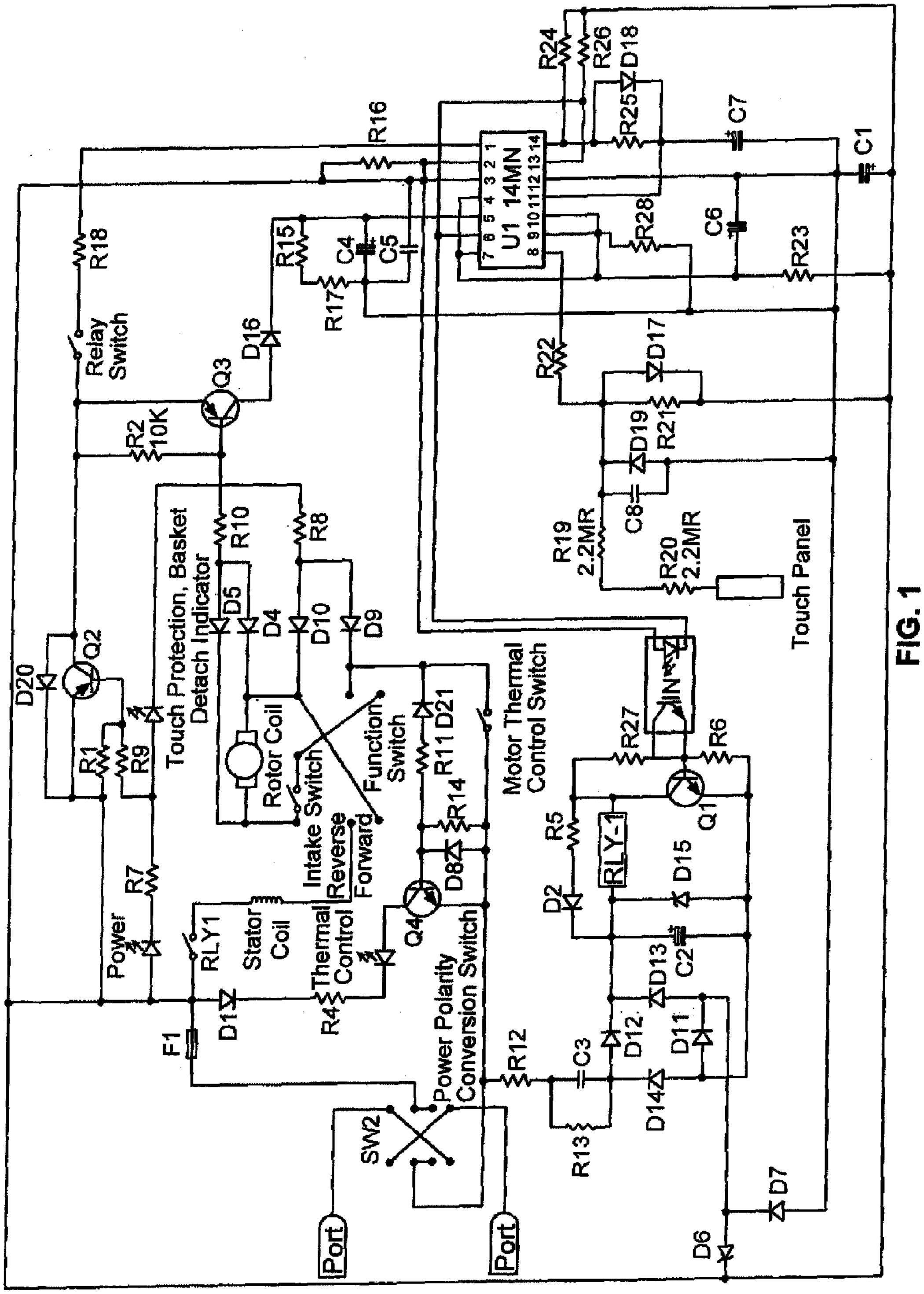
FIG. 1 is a circuit diagram illustrating the electrical components of a shredder control system using prior art technology.
Figure 2:
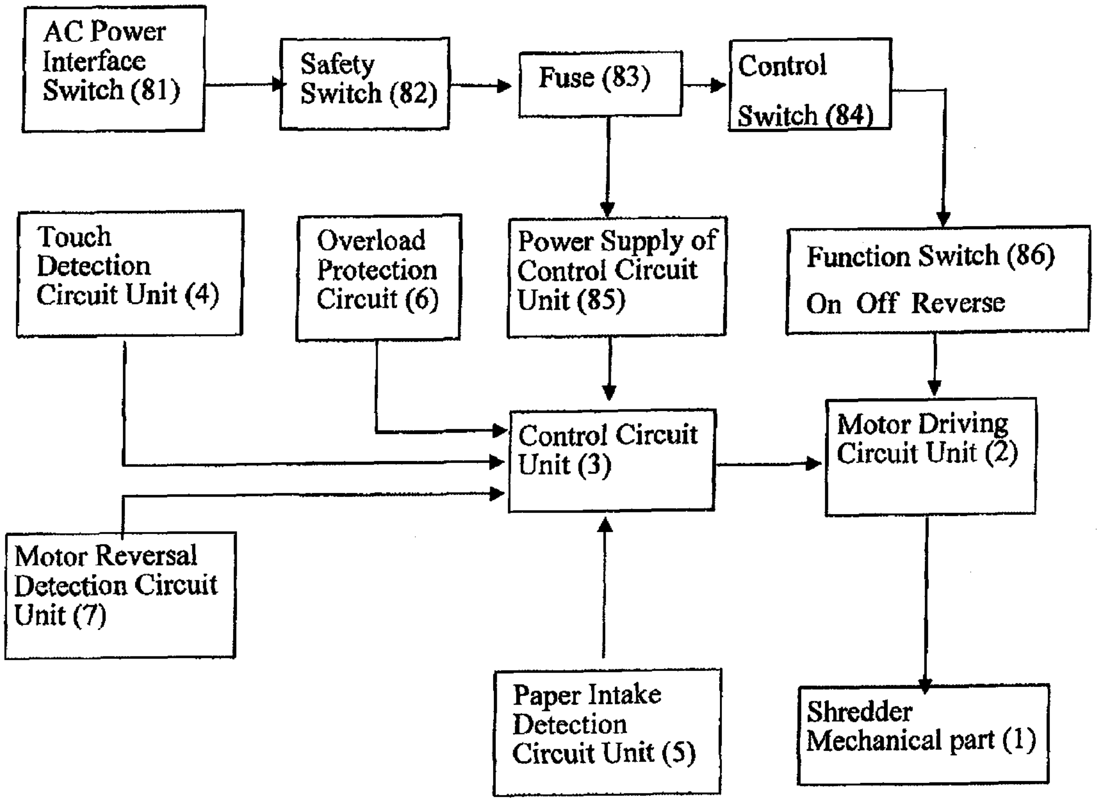
FIG. 2 is a block diagram of the components and modules within a touch-sensitive paper shredder control system of the present invention.

In one embodiment, the touch-sensitive paper shredder control system may include the following components: a function module, a power supply module, and shredder mechanical parts. Referring to FIG. 2, the function module consists of a touch detection circuit unit 4, motor reversal detection circuit unit 7, paper intake detection circuit unit 5, overload protection circuit 6, control circuit unit 3, and function switch 86. All of these units are connected directly to control circuit unit except for the function switch, which together with the control circuit unit controls the motor driving circuit unit 2, and then the shredder mechanical part 1. A conductive touch panel is connected to the touch detection circuit unit, which consists of a bioelectricity controlled switching circuit and a ground switching circuit.

The power supply module consists of an AC power interface unit 81, security switch 82, fuse 83, control switch 84, power supply of control circuit unit 85, and the motor driving circuit unit 2. The control switch is a relay switch, and the security switch is a door switch. The first four of the above-mentioned units are connected in series and, through the control of function switch 86, connected to motor driving circuit unit. The power, through the fuse, is connected to the power supply of control circuit unit, and then to the control circuit unit.

Figure 3:
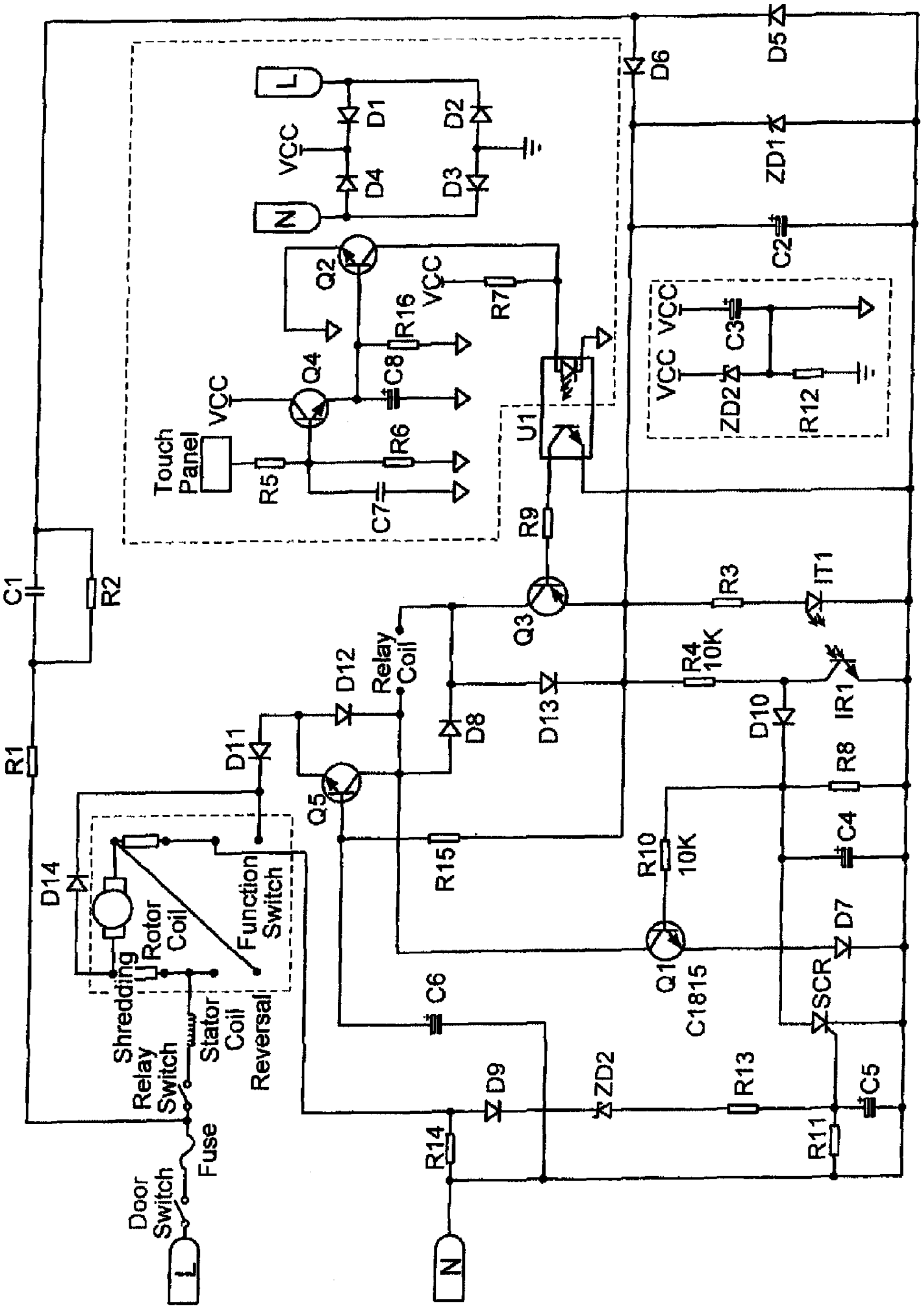
FIG. 3 is a circuit diagram of the electrical components of a touch-sensitive paper shredder control system of the present invention.

Turning to FIG. 3, in one embodiment, the bioelectricity controlled switching circuit is mainly a switching transistor circuit. The conductive touch panel is connected to the base of switching transistor Q4 via resistor R5. Transistor Q4 has its base connected to ground through paralleled capacitor C7 and resistor R6, its collector connected directly to power VCC, and its emitter connected to ground through paralleled capacitor C8 and resistor R16. The emitter of Q4 is also connected directly to the ground switching circuit.

The ground switching circuit is also a switching transistor circuit. The output from the bioelectricity controlled switching circuit is connected to the input of the ground switching circuit, i.e. the emitter of transistor Q2. Transistor Q2 has its emitter connected directly to ground, its collector connected to VCC through resistor R7, and its collector connected to the input of control circuit unit through an optical coupler U1.

Figure 4:
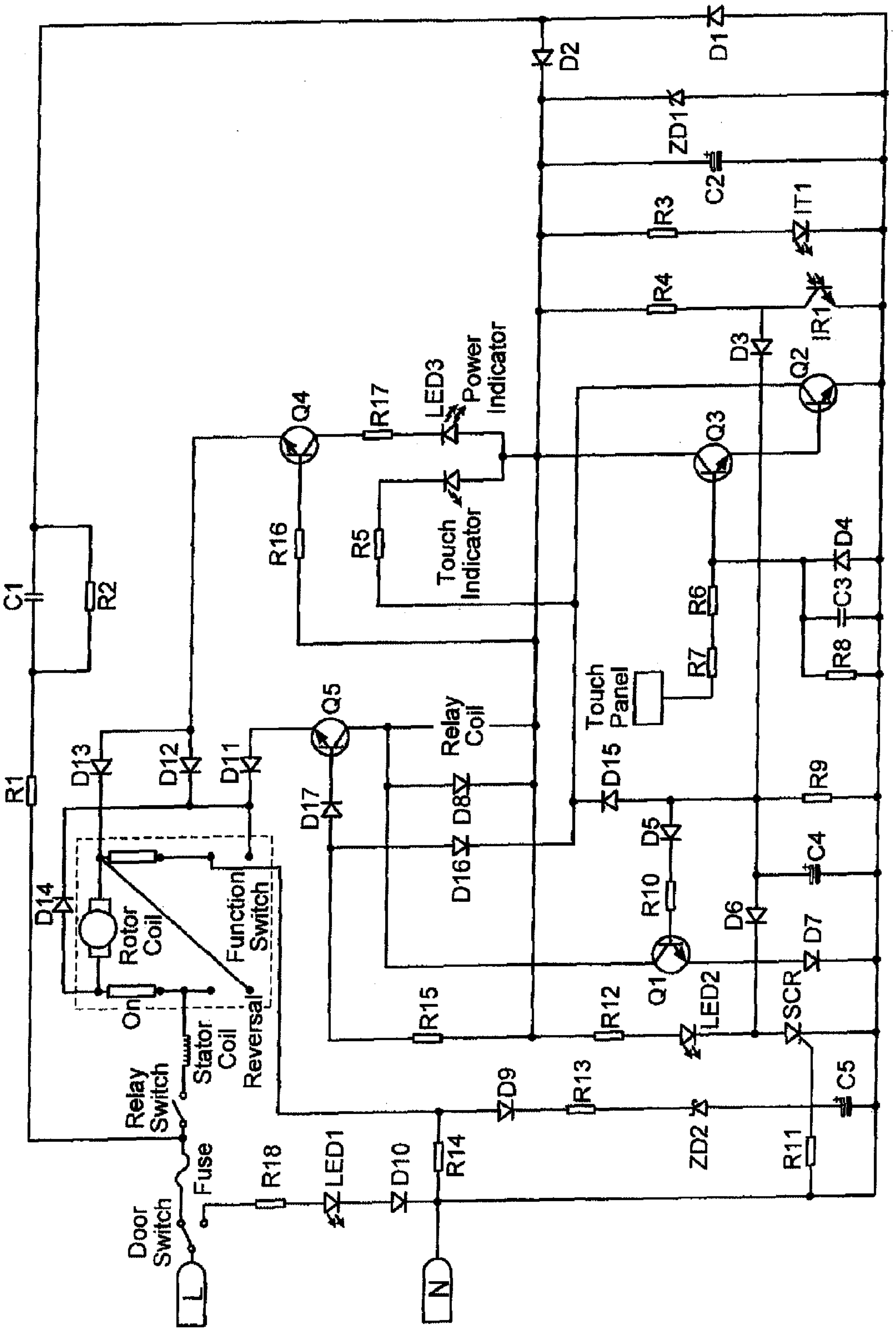
FIG. 4 is the circuit diagram of the electrical components of another embodiment of a touch-sensitive paper shredder control system of the present invention.

Referring to FIG. 4, in another embodiment a bioelectricity controlled switching circuit is based on transistor Q3. The touch panel is connected to the input of the bioelectricity controlled switching circuit, i.e. the base of the switching transistor Q3 through a serial combination of resistors R6 and R7. Transistor Q3 has its base connected to ground via a parallel combination of capacitor C3, diode D4, and resistor R8, the collector is connected to power supply VCC through a parallel combination of power indicator and touch indicator LED3, and the emitter is connected directly to the input of the ground switching circuit.

The ground switching circuit is also a transistor circuit. The output from the bioelectricity controlled switching circuit, i.e. the emitter of transistor Q3, is connected directly to the base of the switching transistor Q2. The emitter of transistor Q2 is connected directly to ground, and the collector is connected to the input of the control circuit unit 3.

Referring to FIG. 2 the paper intake detection circuit unit is connected to the control circuit unit 3. Now turning to FIG. 3, the paper intake detection circuit unit consists of a light emitting diode IT1, and a photosensitive diode IR1 which face each other on opposite positions on the wall of the feed throat of the shredder. Both the overload protection circuit unit 6 and the motor reverse detection circuit unit 7 are connected to the control circuit unit 3 of the touch-sensitive paper shredder.

Referring back to FIG. 2, both the motor reversal detection unit 7 and the paper intake detection unit 5 are connected to control circuit unit 3, then the motor driving circuit unit 2, and then to the shredder mechanical part 1. The motor reversal detection unit 7 detects the reversal signal, sends the electric signal to the control circuit unit 3, then electrically controls the shredder mechanical part 1 to reverse the motor direction through motor driving circuit unit 2. The paper intake detection circuit unit 5 detects the paper insertion at the feed throat, sends the signal to the control circuit unit, and then drives the shredder mechanical part to cut the paper through motor driving circuit unit.

Figure 5:
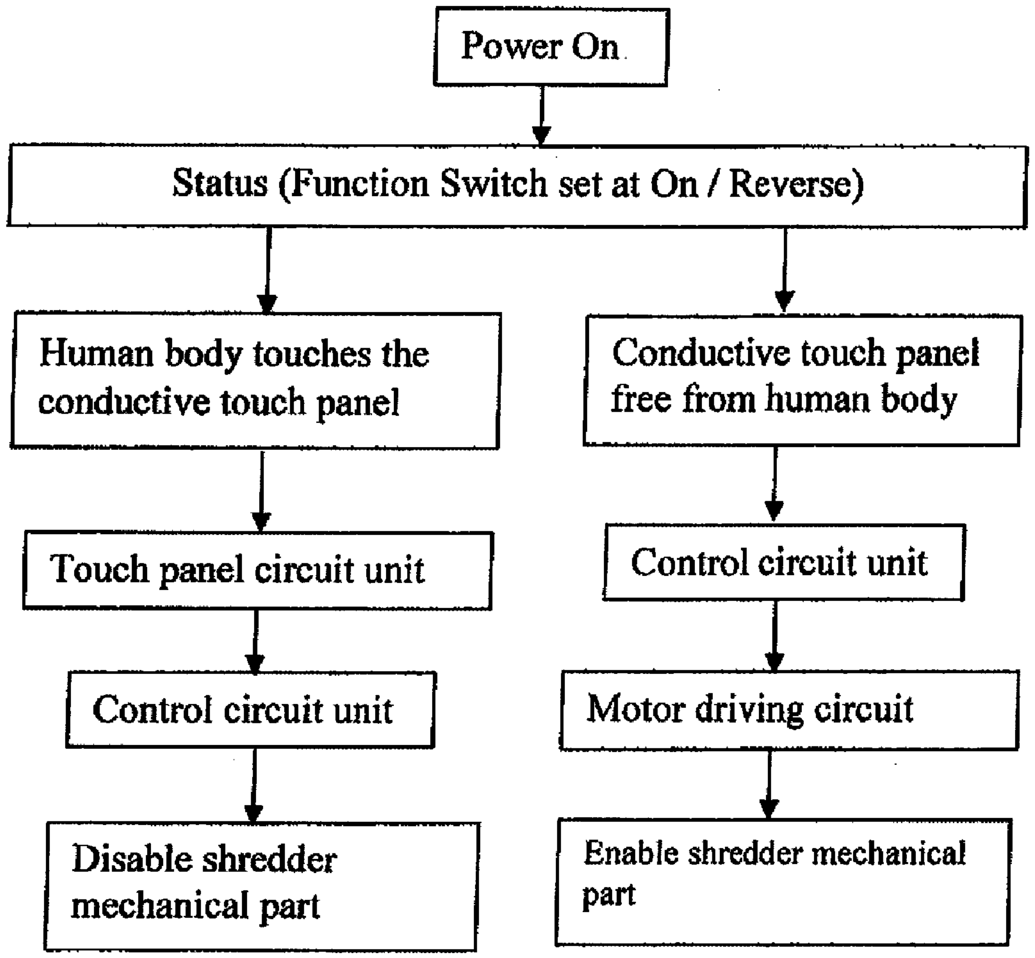
FIG. 5 is a flow chart of the control process used in connection with a touch-sensitive paper shredder control system of the present invention.

Referring now to FIG. 5, during the paper shredding process, if a human body touches the touch panel of the feed throat, the shredder will slop immediately. The touch signal is sent to touch detection circuit unit 4, then goes to control circuit unit 3, and stops the shredder by cutting the power to motor driving circuit unit 2. If a human body doesn't touch the conductive touch panel, the control circuit unit will release the control to motor driving circuit unit 2 to allow the mechanical part to work independently.

Referring back to FIG. 3, the shredder has the following features: overload protection; optics controlled shredding; shredding, shutdown, and reversed rotation functions; and automatic touch-stop.

The power supply of the control circuit unit is described below. AC input power is divided, rectified, regulated, and filtered by the circuit consists of resistors R1 and R2, capacitors C1 and C2, diodes D5 and D6, and Zener diode ZD1. The regulated 24 volts DC power is the power source for the control circuit unit. It's far below the safety voltage to pass through human body and will do no harm to human or animals.

The power supply for the touch detection circuit unit is described below. The AC input power, going through a bridge rectifier, is regulated and filtered to provide 12 volts DC voltage. The circuits consists of diodes D1-D4, Zener diode ZD2, resistor R12 and capacitor C3.

When a human touches the metal panel, the bioelectricity from the human body goes to the base of the transistor Q4 via a 1 MW resistor. The bioelectricity triggers transistors Q4 and Q2 on, cuts off transistor Q3, and thus cuts the motor power so that the shredder automatically stops when people touch the feed throat.

Referring now to FIG. 4, the shredder in this embodiment has the following features: on-off LED indicator; touch protection LED indicator; overload LED indicator; AC Power indicator; optics controlled shredding; and shredding, shutdown, and reversed rotation function.

The overload protection and door open LED indicating functions are implemented by the circuit consists of R18, R14, R13, R11, and R12, light emitting diodes LED1 and LED2, diodes D10, D9, and D6, Zener diode ZD2, capacitor C5 and silicon controlled rectifier SCR.

The power supply for the control circuit unit includes a circuit consisting of resistors R1 and R2, capacitors C1 and C2, diodes D1 and D2, Zener diode ZD1, and capacitor C2. The same regulated 24 volts DC power is used as the power source for the control circuit unit. It's far below the safety voltage to pass through a human body and will do no harm to human or animals.

The touching function is described below. When human touches the metal panel, the bioelectricity from a human body goes to the base of the transistor Q3 via resistors R6 and R7. The signal triggers Q3 and Q2 on, turns Q1 off, and cuts the power to the motor. The motor stops turning and people are protected. The touch detection circuit unit will be more stable if it uses an independent bridge power supply and is isolated from the motor by an optical coupler.

When a human touches the panel, the touch of human on the metal part of the panel provides a triggering signal which via base bias circuit, turns Q3 on. The base bias circuit consists of resistors R7, R6 and R8, diode D4, and capacitor C3. With enough forward voltage from a human Q3 and Q2 are both turned on. When Q2 is on, its collector voltage drops and thus it turns on touch indicator via R5, turns off Q5 via D16, and turns off Q1 via D15. If the machine were turning reversely at this moment, Q5 would be on. But because of the touch voltage, Q5 is turned off and so is the motor. The other situation is when the machine is in a shredding state. In this case Q1 would be on to turn the motor in the forward direction. But because of human touch Q1 is turned off and motor is turned off, too. In either case, the machine is shut off to ensure the safety of human.

When a human no longer touches the machine's metal plate, transistor Q3 turns off because there is no trigger voltage and the machine returns to a normal working state. The working principle of the power on indicating circuit is as below. When the machine is in the shredding or reversal state as selected from the function switch, the power on indicator in on and when the machine is in a stopped state, the indicator is off. The indicator circuit includes an indicator lamp, resistors R17 and R16, and transistor Q4. When the machine is in the stop state, the indicator is off because transistor Q4 is not conducting. As for the reversal state, the emitter junction of transistor Q4, diode D12, and function switch complete a circuit and the power on indicator is on. While the machine is in the shredding state, the emitter of Q4, diode D13, and the function switch complete a circuit and the power indicator is on.

As detailed above, the touch-sensitive paper shredder control system has adopted cascaded circuits. On the machine feed throat there is a conductive touch panel, which is connected to bioelectricity controlled switching circuit, ground switching circuit, control circuit unit, and then shredder mechanical part. All these circuits ensure human safety when human touches the conductive touch panel. The electricity from a human body enables the bioelectricity controlled switching circuit, and then all the connected circuits. The control circuit unit disables the shredder mechanical part and it ensures human safety. Even if the power switch is turned on, the mechanical part of the shredder still won't work if a human is touching the touch panel. The shredder realizes real time monitoring and the complete control process is both safe and sensitive. The machine performance is stable and reliable. It is easy to operate without human intrusion, can be applied in wide situations, and brings safety assurance.

Although the present invention has been described by way of example with references to the circuit drawings, it is to be noted herein that various changes and modifications will be apparent to those skilled in the art. Therefore, unless such changes and modifications depart from the scope of the present invention, they should be construed as being included therein.

What is claimed is:

1. A touch-sensitive paper shredder control system, comprising:

a shredder mechanical part;

a touch panel coupled to the shredder mechanical part; and a control system coupled to the shredder mechanical part and to the touch panel, wherein bioelectricity from a living being applied to the touch panel actuates the control system to stop the shredder mechanical part.

2. The touch-sensitive paper shredder control system of claim 1, further comprising:

an optical coupler connected between the touch panel and the shredder mechanical part, wherein the optical coupler provides electrical isolation of the touch panel from the shredder mechanical part.

3. The touch-sensitive paper shredder control system of claim 1, wherein the control system provides substantially real-time monitoring of contact with a living being.

4. The touch-sensitive paper shredder control system of claim 1, wherein:

the shredder mechanical part includes a reversible shredder motor;

the control system includes a three position switch having, on, off, and reverse positions; and the control system is operable to disable the reversible shredder motor when the three position switch is in the ON position or in the REVERSE position.

5. The touch-sensitive paper shredder control system of claim 1, wherein:

power to the reversible shredder motor is controlled by a relay switch.

6. The touch-sensitive paper shredder control system of claim 1, wherein the bioelectricity is a static electrical charge produced by the living being.

7. The touch-sensitive paper shredder controller of claim 1, wherein the bioelectricity is a moving electrical charge produced by the living being.

8. A touch-sensitive paper shredder system, comprising:

a shredder motor;

a bioelectricity-controlled switching circuit including a touch panel disposed near a throat of a shredder;

a shredder control system coupled between the bioelectricity-controlled switching circuit and the shredded motor, wherein the bioelectricity-controlled switching circuit cooperates with the shredded control system to stop the shredder motor when a living being-contacts, and applies bioelectricity to, the touch panel.

9. The touch-sensitive paper shredder system of claim 8 further comprising:

an optical coupler interposed in an electrical path between the touch panel and the shredder control system, wherein a bioelectricity signal from the bioelectricity-controlled switching circuit is coupled through the optical coupler to actuate the shredder control circuit to stop an operating shredder motor.

10. The touch-sensitive paper shredder system of claim 9, further comprising a grounding switch circuit coupled to transmit to the optical coupler, a bioelectricity signal received from the bioelectricity controlled switching circuit, wherein the grounding switch circuit couples the bioelectricity signal from the bioelectricity-controlled switching circuit to the optical coupler.

11. The touch-sensitive paper shredder system of claim 10, wherein the bioelectricity-controlled switching circuit includes a first cascaded transistor having a base coupled to the touch panel, a collector coupled to a power supply, and an emitter coupled the base of a ground switching circuit cascaded transistor, wherein the emitter of the second cascaded transistor is coupled to electrical ground, and the emitter of the ground switching circuit cascaded transistor is coupled to the optical coupler input.

12. The touch-sensitive paper shredder system of claim 8, wherein the bioelectricity signal is a static electrical charge produced by the living being.

13. The touch-sensitive paper shredder system of claim 8, wherein the bioelectricity signal is a moving electrical charge produced by the living being.

14. A touch-sensitive paper shredder system comprising:

a powered shredder motor;

a touch detection circuit unit coupled to a touch panel;

a control circuit unit, having a control switch coupled to the powered motor; and an optical isolator coupled to electrically isolate the touch detection unit and the control circuit unit, while transmitting a touch signal representative of the bioelectricity, wherein while the shredder is operating bioelectricity applied to the touch panel by a living being is received by the touch panel while the shredder is operating, bioelectricity flows through energizing the touch detection circuit to actuate the control system to stop the powered shredder motor; and wherein the control switch is a reed switch.

15. The touch-sensitive paper shredder system of claim 14, wherein the bioelectricity signal is one of a static electrical charge or a moving electrical charge, produced by the living being.

16. A method of controlling a paper shredder with a touch-sensitive device comprising:

providing a powered shredder motor, which can be operated in one of a forward direction or a reverse direction;

providing a touch-sensitive touch panel near a shredder inlet, wherein the touch-sensitive panel can be energized by the bioelectrical signal of a living being;

providing a control circuit coupled to the touch sensitive touch panel and configured to receive a touch signal representative of a received bioelectric signal; and configuring the control circuit to cease operation of the powered shredder motor in one of a forward direction or a reverse direction, responsive to the living being contacting the touch panel.

17. The method of claim 16, further comprising:

providing electrical isolation between the touch pad and a voltage that operates one or both of the control circuit and the powered shredder motor.

18. A paper shredder safety system comprising:

a powered reversible shredder motor;

a safety control circuit coupled to the powered reversible shredder motor;

a ground switching circuit coupled to the safety control circuit;

a bioelectricity controlled switching circuit coupled to the safety control circuit, and comprising a touch panel in proximity with a feed throat of the shredder; and wherein when a bioelectricity signal is sensed from a living being in proximity with the touch panel, and, in response, the safety control circuit actuates the ground switching circuit to stop the powered reversible shredder motor.

19. The paper shredder safety system of claim 18, further comprising:

a safety switch having an electrical member coupled to the safety control circuit and a mechanical member coupled to proximally mate with an articulating portion of a shredder chassis, wherein the electrical member transmits a safety switch signal to the safety control circuit when the proximal mating of the mechanical member and the articulating portion is disrupted, and wherein the safety control circuit actuates the control circuit to stop the powered reversible shredder motor.

* * * * *